(12) United States Patent
Clutterbuck et al.

(10) Patent No.: US 8,646,908 B2
(45) Date of Patent: Feb. 11, 2014

(54) ROTATIONALLY STABILIZED CONTACT LENSES AND METHODS FOR THEIR DESIGN

(75) Inventors: Timothy A. Clutterbuck, Jacksonville, FL (US); Khaled Chehab, Jacksonville, FL (US); Edgar V. Menezes, Jacksonville, FL (US); Steven E. Franklin, Eindhoven (NL); Cornelis P. Hendriks, Eindhoven (NL); Willem Potze, Geldrop (NL)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

(21) Appl. No.: 12/041,752

(22) Filed: Mar. 4, 2008

(65) Prior Publication Data

US 2009/0225273 A1   Sep. 10, 2009

(51) Int. Cl.
  *G02C 7/04* (2006.01)
(52) U.S. Cl.
  USPC .................................................. 351/159.36
(58) Field of Classification Search
  USPC .................... 351/174, 160 R, 159.36, 159.19
  See application file for complete search history.

(56) References Cited

U.S. PATENT DOCUMENTS

| | | |
|---|---|---|
| 2,347,488 A | 4/1944 | Lawlor et al. |
| 4,084,890 A | 4/1978 | Baron |
| 4,095,878 A | 6/1978 | Fanti |
| 4,573,774 A | 3/1986 | Sitterle |
| 4,820,038 A | 4/1989 | Seger et al. |
| 4,859,049 A | 8/1989 | Muller et al. |
| 5,020,898 A | 6/1991 | Townsley |
| 5,057,578 A | 10/1991 | Spinelli |
| 5,100,225 A | 3/1992 | Rothe |
| 5,314,960 A | 5/1994 | Sinelli et al. |
| 5,371,147 A | 12/1994 | Spinelli et al. |
| 5,448,312 A | 9/1995 | Roffman et al. |
| 5,455,641 A | 10/1995 | Hayne et al. |
| 5,485,228 A | 1/1996 | Roffman et al. |
| 5,532,768 A | 7/1996 | Onogi et al. |
| 5,540,410 A | 7/1996 | Lust et al. |
| 5,652,638 A | 7/1997 | Roffman et al. |
| 5,715,031 A | 2/1998 | Roffman et al. |
| 5,805,260 A | 9/1998 | Roffman et al. |
| 5,861,114 A | 1/1999 | Roffman et al. |
| 5,912,719 A * | 6/1999 | Baude et al. ............ 351/159.02 |
| 5,929,969 A | 7/1999 | Roffman |
| 5,971,542 A | 10/1999 | Volker et al. |

(Continued)

FOREIGN PATENT DOCUMENTS

| | | |
|---|---|---|
| EP | 0062178 A | 10/1982 |
| EP | 0062178 A1 | 10/1982 |

(Continued)

OTHER PUBLICATIONS

International Search Report PCT/US2009/036000 Date of Mailing Oct. 22, 2009.

(Continued)

*Primary Examiner* — Zachary Wilkes

(57) ABSTRACT

The invention provides dual stabilization zones that interact with an individual's eyelids so that at least the upper eyelid strikes both stabilization zones of a lens at the same time. The stabilized lenses of the invention maintain their on-eye orientation better as compared to conventionally stabilized lenses.

19 Claims, 5 Drawing Sheets

(56) References Cited

U.S. PATENT DOCUMENTS

| | | | |
|---|---|---|---|
| 5,988,813 | A | 11/1999 | Neadle et al. |
| 6,092,899 | A | 7/2000 | Wanders et al. |
| 6,093,868 | A | 7/2000 | Sawano et al. |
| 6,135,594 | A | 10/2000 | Windey et al. |
| 6,176,578 | B1 | 1/2001 | Clutterbuck et al. |
| 6,176,579 | B1 | 1/2001 | Mandell |
| 6,179,420 | B1 | 1/2001 | Roffman et al. |
| 6,183,082 | B1 | 2/2001 | Clutterbuck |
| 6,234,629 | B1 | 5/2001 | Neadle et al. |
| 6,305,802 | B1 | 10/2001 | Roffman et al. |
| 6,467,903 | B1 * | 10/2002 | Back .......................... 351/160 H |
| 6,511,178 | B1 | 1/2003 | Roffman et al. |
| 6,520,638 | B1 | 2/2003 | Roffman et al. |
| 6,554,425 | B1 | 4/2003 | Roffman et al. |
| 6,595,639 | B1 | 7/2003 | Ho et al. |
| 6,851,805 | B2 | 2/2005 | Blum et al. |
| 6,939,005 | B2 | 9/2005 | Jubin et al. |
| 6,971,746 | B2 * | 12/2005 | Back .......................... 351/160 H |
| 6,994,435 | B2 | 2/2006 | Shirayanagi |
| 7,004,585 | B2 * | 2/2006 | Lindacher ..................... 351/161 |
| 7,018,039 | B2 | 3/2006 | Legerton et al. |
| 7,036,930 | B2 | 5/2006 | Jubin et al. |
| 7,040,757 | B2 | 5/2006 | Hall et al. |
| 7,080,906 | B2 * | 7/2006 | Lindacher ..................... 351/161 |
| 7,159,979 | B2 | 1/2007 | Jubin et al. |
| 7,201,480 | B2 | 4/2007 | Neadle et al. |
| 7,216,978 | B2 | 5/2007 | Perez et al. |
| 7,758,187 | B2 * | 7/2010 | Amirparviz ................... 351/162 |
| 2002/0024631 | A1 * | 2/2002 | Roffman et al. ............... 351/161 |
| 2002/0071094 | A1 | 6/2002 | Roffman et al. |
| 2005/0041201 | A1 | 2/2005 | Shapiro |
| 2005/0256570 | A1 * | 11/2005 | Azar ........................... 623/5.14 |
| 2007/0019155 | A1 | 1/2007 | Back |

FOREIGN PATENT DOCUMENTS

| | | |
|---|---|---|
| EP | 398984 B1 | 11/1990 |
| EP | 571320 A1 | 11/1993 |
| EP | 440107 B1 | 9/1994 |
| EP | 0440107 B1 | 4/1996 |
| EP | 0741313 A | 11/1996 |
| EP | 0741313 A2 | 11/1996 |
| EP | 0742462 A2 | 11/1996 |
| EP | 0866354 A1 | 9/1998 |
| EP | 980015 A1 | 2/2000 |
| EP | 0980015 A1 | 2/2000 |
| GB | 2041557 A | 9/1980 |
| RU | 27429 U1 | 1/2003 |
| RU | 32294 U1 | 9/2003 |
| WO | 01/75509 A | 10/2001 |
| WO | WO 01/75509 A | 10/2001 |
| WO | WO 2004010204 A1 | 1/2004 |
| WO | 2004/015480 A1 | 2/2004 |
| WO | WO 2004/015480 A1 | 2/2004 |
| WO | 2004/068214 A1 | 8/2004 |
| WO | WO 2004068214 A1 | 8/2004 |

OTHER PUBLICATIONS

U.S. Appl. No. 60/363,639, filed Mar. 11, 2002, Kindt-Larsen, T.
Notification from the Russian Patent Office for corresponding Patent Application No. 2412-170782RU/7200.

* cited by examiner

US 8,646,908 B2

ROTATIONALLY STABILIZED CONTACT LENSES AND METHODS FOR THEIR DESIGN

FIELD OF THE INVENTION

The invention relates to contact lenses. In particular, the invention provides contact lenses in which the rotational stability is asymmetric.

BACKGROUND OF THE INVENTION

It is known that correction of certain optical defects can be accomplished by imparting non-spherical corrective characteristics to one or more surfaces of a contact lens such as cylindrical, bifocal, multifocal, and wavefront corrective characteristics. Additionally, lenses with non-rotationally symmetric tinted patterns, back surfaces that match corneal topography, and lenses with off-set optic zones are known. The use of these lenses is problematic in that the lenses must be maintained at a specific orientation while on the eye to be effective. When such a lens is first placed on the eye, it must automatically position, or auto-position, itself and then maintain that position over time. However, once the lens is positioned, it tends to rotate on the eye due to the forces exerted on the lens by the eyelids during blinking.

Maintenance of the on-eye orientation of a lens typically is accomplished by altering the mechanical characteristics of the lens. For example, prism stabilization, including, without limitation, decentering of the lens' front surface relative to the back surface, thickening of the inferior lens periphery, forming depressions or elevations on the lens' surface, and truncating the lens edge, has been used.

Additionally, dynamic stabilization has been used in which the lens is stabilized by the use of thick and thin zones, or areas in which the thickness of the lens' periphery is increased or reduced, as the case may be. Typically, the thin and thick zones are located symmetrically about the lens' periphery. For example, each of two thick zones may be positioned on either side of the optic zone and centered along the 0-180 degree axis of the lens. The symmetric stabilization zones are disadvantageous because one eyelid, the upper eyelid, for example, will strike one end of a stabilization zone before it strikes the other stabilization zone. This results in tilting of the lens moving it away from the orientation that is sought to be maintained.

DETAILED DESCRIPTION OF THE INVENTION AND PREFERRED EMBODIMENTS

It is a discovery of the invention that a stabilized contact lens with dual stabilization zones that has improved performance in comparison to conventional dual stabilization zone lenses may be obtained by making the stabilization zones asymmetric. More specifically, it is a discovery of the invention that by designing the dual stabilization zones to interact with an individual's eyelids so that at least the upper eyelid strikes, and preferably the lower eyelid also strikes, both stabilization zones of a lens at the same time, the stabilized lenses of the invention maintain their on-eye orientation better as compared to conventionally stabilized lenses.

In one embodiment, the invention provides a contact lens comprising, consisting essentially of, and consisting of an optic zone, a lens periphery and a first and a second thick zone within the lens periphery, wherein the first and second thick zones are asymmetric.

For purposes of the invention, by "thick zone" is meant an area within the lens periphery within which the lens periphery is thicker as compared to other areas of the lens periphery. The thickness at any given point on the lens is measured in terms of the distance between the front, or object side, surface and back, or eye side, surface of the lens along a direction orthogonal to the back surface.

By "lens periphery" is meant the non-optical portion of the lens that lies adjacent to and surrounds the optic zone. For purposes of the invention, the lens periphery excludes the lens edge, or outermost portion of the lens relative to its geometric center. Typically, the lens edge is about 0.02 mm to about 0.2 mm in width.

By "asymmetric" is meant that the stabilization zones are not symmetric about the horizontal, or 0-180 degree, and vertical, or 90-270 degree, axes of the lens.

Figure 1:
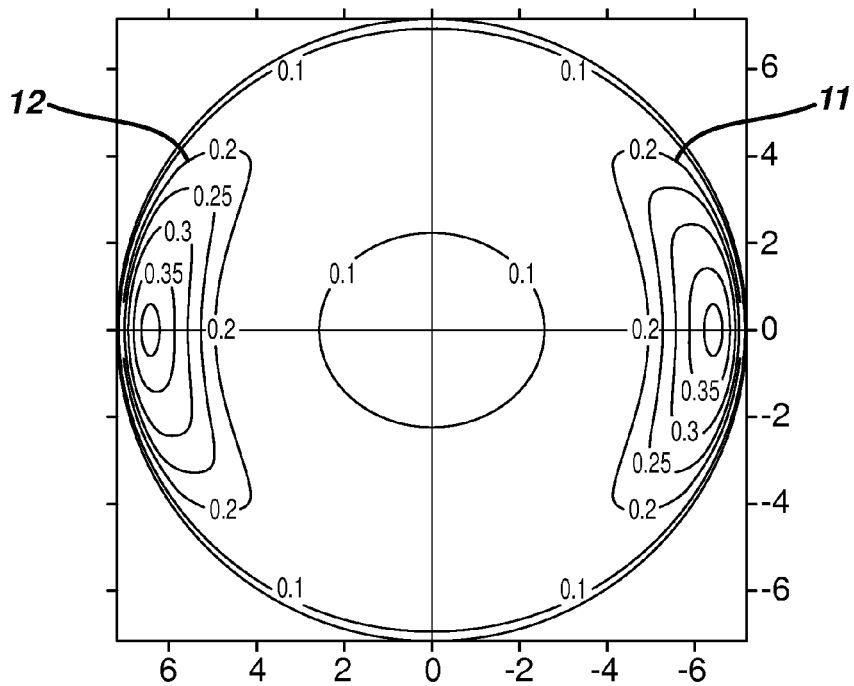
FIG. 1 is a thickness contour plot of a plan view of a surface of a contact lens having stabilization zones that are symmetric, dual thick zones.

Two stabilization zones are symmetric about the vertical axis if one stabilization zone on one side of the surface of the lens with respect to the vertical axis is a mirror image as far as position, size and shape of a second stabilization zone on the other side of the lens surface. Two stabilization zone are symmetric about the horizontal axis if the portion of one stabilization zone below the horizontal axis is a mirror image as far as position, size and shape of the portion of the same stabilization zone above the horizontal axis. For example, in FIG. 1 is shown a thickness contour plot of a plan view of a surface of a contact lens having stabilization zones that are symmetric, dual thick zones. More specifically, each of thick zones 11 and 12 are shown which are centered around either end of the horizontal axis. Also as shown, zones 11 and 12 are vertically symmetric.

In designing the lenses of the invention, the designer first selects certain lens parameters desired for the final lens and ocular measurement parameters. These lens and ocular parameters are: the lens diameter, the upper eyelid angle ("ULA"); the upper eyelid position or distance from the geometric center of the lens to the upper eyelid ("ULP"); the lower eyelid angle ("LLA"); and the lower eyelid positions with respect to the lens' geometric center ("LLP"). Additionally, the designer selects stabilization zone data for each of the stabilization zones as follows: the thickness profile of the peak meridian, meaning the meridian along which the stabilization zone peak thickness is located; the peripheral radial distance, meaning the distance from the geometric center of the lens to the point at which the stabilization zone is at a maximum thickness; and the functional change in thickness with respect to the radial distance ("r") from the lens' geometric center and the meridian angle ("θ").

Figure 2:
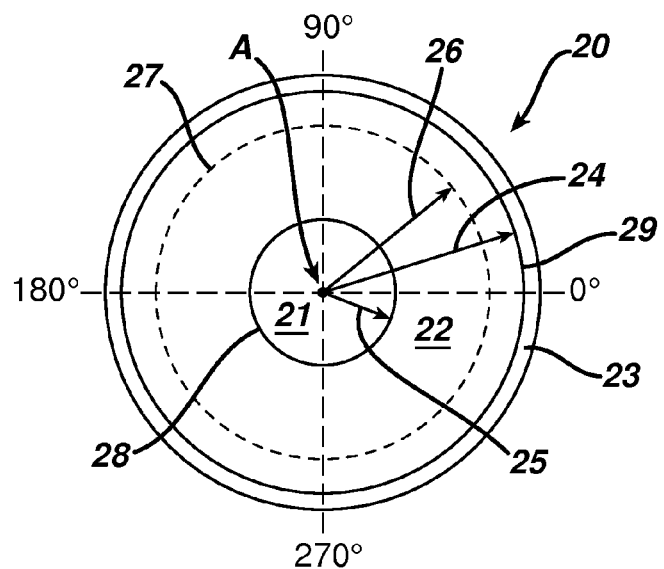
FIG. 2 is a plan view of a front surface of a contact lens.

For illustration purposes, FIG. 2 is a plan view of a front surface of a contact lens 20 has optic zone 21, lens periphery 22 and lens edge 23. For purposes of the invention, the top of the lens is that part of the lens above the horizontal meridian and at and about the 90 degree position and the bottom of the lens is that part of the lens below the horizontal meridian and at or about the 270 degree position. Point A is the geometric center of the lens. Line 25 extends radially outwardly to the innermost boundary 28, relative to the lens' geometric center, of the lens periphery and line 24 extends to the outermost boundary 29 of the lens periphery. Line 26 is the peripheral radial distance. This distance may be any distance between lines 24 and 25. Dotted circle 27 depicts a circumference along which the maximum thicknesses of the stabilization zones for the final lens may be located.

Figure 3:
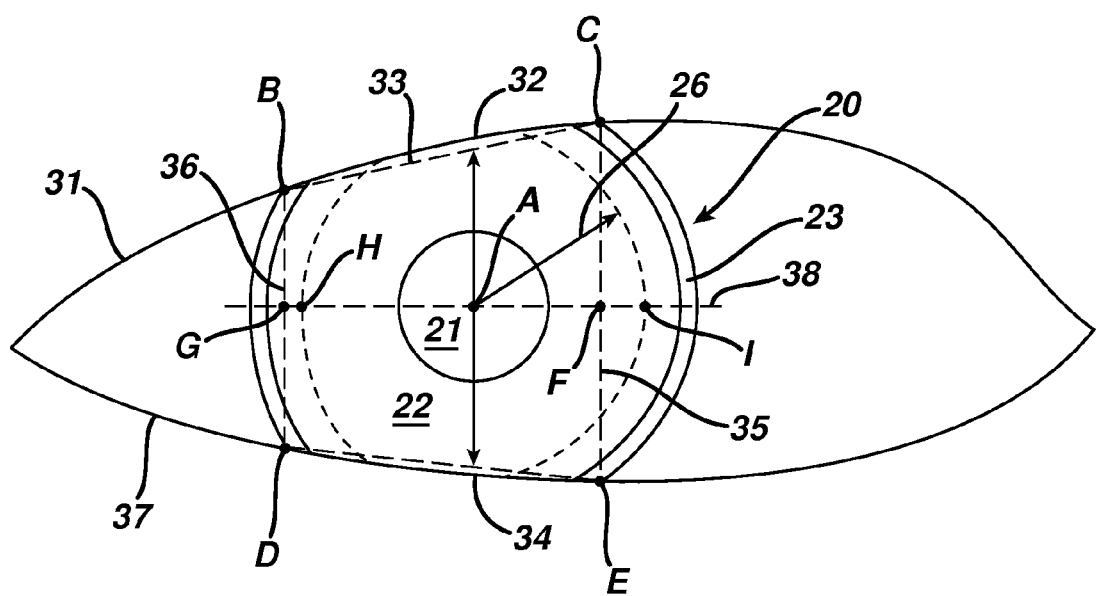
FIG. 3 is the lens of FIG. 2 shown on an eye.

With reference to FIG. 3, as shown, reference number 31 refers to the upper eyelid and 37 refers to the lower eyelid. The point at which the upper lid 31 intersects the outermost boundary of the cornea on each side of the eye, points B and C as shown, respectively is determined by geometry using eyelid input data. For example, assume:

ULA is the upper lid angle;
ULP is the distance from the geometric center of the lens to the upper lid (line 32 in FIG. 3);
LDI is the diameter of the contact lens;
$aa = 1 + \mathrm{Tan}(ULA)^2$;
$bb = -ULP$; and
$cc = ULP^2 - LDI^{2/4} * \mathrm{TAN}(ULA)^2$;

If point C is located at coordinates (x, y), then $$x = \sqrt{LDI^{2/4} - y^2} \quad \text{and} \tag{I}$$

$$y = \frac{\left(-bb + \mathrm{SGN}(ULA) * \sqrt{bb^2 - aa * cc}\right)}{aa} \tag{II}$$

In FIG. 3, line 33 is a line joining points B and C. An upper eyelid angle ("ULA") is then defined as the angle of line 33 with respect to the horizontal axis of the lens.

In the method of the invention, the upper eyelid is preferably used because this lid will always intersect both sides of the contact lens. However, it is possible to use the lower eyelid in the above calculation provided that it intersects both sides of the contact lens.

In those cases in which the lower eyelid does not intersect both sides of the contact lens, the lower lid angle ("LLA") must be estimated. This may be accomplished by drawing a line tangent to the lower eyelid and centered at the geometric center of the cornea. With reference to FIG. 3, line 34 is a vertical line centered at the geometric center of the cornea and extends to and intersects the lower eyelid 37. In carrying out the calculations set forth herein, the values for ULA, LLA, ULP and LLP may be based on population measurements or may be, and preferably are, measurements of an individual Subsequently, lines 35 and 36 are drawn from each of points B and C to the lower eyelid 37. The point at which each of these lines intersects the lower eyelid 34 is shown as D and E, respectively, in FIG. 3. The midpoints F and G of each of lines 35 and 36, respectively, are determined and a straight line 38 is drawn between the points and extends through the points and beyond the outermost boundary of lens edge 23.

The points H and I at which lines 36 and 35 each intersects the peripheral radial distance and define a location for the peak thickness, meaning the center of the thickest portion of the stabilization zone. The meridian angle from lens center A is then calculated for each of points H and I. For example, if the coordinates of point G are Gx and Gy and at F are Fx and Fy, then line 38, connecting these points, has an angle of $$\arctan\left\{\frac{Gy - Fy}{Gx - Fx}\right\}.$$

The uppermost, meaning closest to the top of the lens, border and lowermost, meaning closest to the bottom of the lens, border of the stabilization zone on each side of the lens are then determined. The uppermost and lowermost borders may be located at the point of intersection of the eyelid and the outermost edge of the peripheral radial distance. Preferably, each of the borders ends 5 to 10 degrees lower than the upper eyelid or higher than the lower eyelid of this point of intersection. In the case in which the lower eyelid does not intersect the lens edge, the lower border may be made symmetric with the upper border or parallel to the lower eyelid, upper eyelid or horizontal axis.

Figure 4:
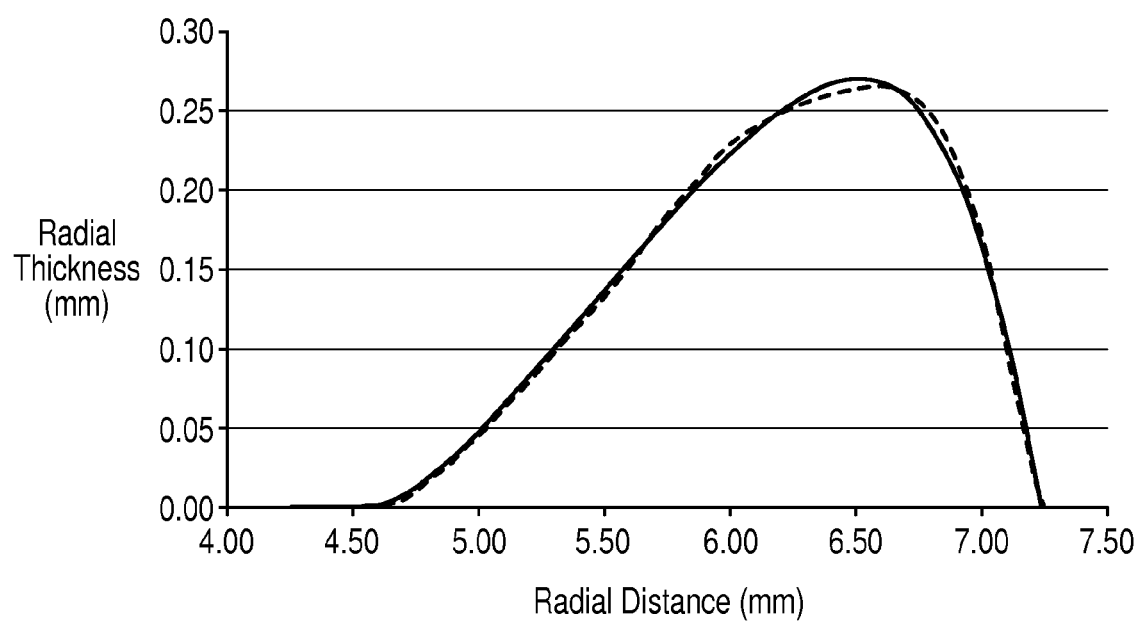
FIG. 4 is a graph of a peak thickness array.

The thickness for the each of the 360 meridians of the lens surface at 1 degree steps is calculated by any convenient method. For example, the thickness ("THK") at a radial distance ("R") is calculated using a peak thickness array or function as shown in FIG. 4. The thickness profile composed of the peak thickness, radial distance of the peak thickness from the lens' geometric center, radial distance between the peak thickness and lens edge, radial thickness change on either side of the peak thickness, stabilization zone length, and angular thickness change on either side of the peak thickness, may be different for each stabilization zone incorporated into the lens.

The ratio ("α") is calculated as follows:

{meridian angle−quadrant start angle}÷total quadrant angle

For purposes of calculating the thickness at a particular location, the following angles are defined:
the meridian angle which is the angle from the horizontal axis to the location;
the quadrant start angle which is the angle between the horizontal axis and the peak meridian; and
the total quadrant angle is which is the angle between the peak meridian and the meridian at which the stabilization zone thickness ends.

Preferably, the ratio is then applied to the thickness change function as follows. The total quadrant angle is first normalized by multiplying by 90. The resulting thickness ("T") is calculated according to the following equation for all quadrants:

$$T = r * \cosine(\alpha)^n$$

wherein n is about 1 to 5 and preferably is about 1.50 to about 3.00.

One ordinarily skilled in the art will recognize that other functional change methods including, without limitation, linear, polynomial and spline functions may be applied for the calculation of thickness "T." Thickness T may now be stored as a function of radial distance r and the meridian angle.

Each of the stabilization zones of the lenses of the invention may take any desirable shape. For example, the zone may linearly increase in thickness from the uppermost portion of the zone to a peak thickness and then linearly decrease in thickness towards the lowermost portion of the zone. Alternatively, the change may be accelerated, or non-linear.

Preferably, the radial width of each of the stabilization zones of the invention is between about 3 and 4 mm, and preferably about 2 and 3 mm at its widest portion. The circumferential length of each of the stabilization zones subtends an angle between about 30 and 120 degrees, and preferably about 50 and 90 degrees. The maximum thickness difference between the thickest portion of the stabilization zone and the thinnest portions is about 0.1 to about 0.4 mm, preferably about 0.2 to about 0.3 mm. The peak of thickness in each of the zones may be located about 5 to about 7 mm, preferably about 6 to 6.5 mm, from the geometric center of the lens.

The invention may be used to stabilize any lens, but may find its greatest utility in lenses that require on-eye stabilization to provide optical correction. Thus, the invention may find its greatest utility in toric and multifocal lenses. Additionally, the designs may be useful in lenses customized to a specific individual's corneal topography, lenses incorporating high order wave-front aberration correction, or both. Preferably, the invention is used to stabilize toric lenses or toric multifocal lenses as, for example, disclosed in U.S. Pat. Nos. 5,652,638, 5,805,260 and 6,183,082 which are incorporated herein by reference in their entireties.

Multifocal lenses include, without limitation, bifocal and progressive lenses. One type of bifocal lens provides an optic zone with annular rings alternating between near and distance optical power. By "near optical power" is meant the amount of refractive power required to correct the wearer's near vision acuity to the desired degree. By "distance optical power" is meant the amount of refractive power required to correct the wearer's distance vision acuity to the desired degree.

The annular rings may be present on the front, or object side, surface, the back, or eye side, surface, or both surfaces of the lens. In a preferred embodiment, a first and a second ophthalmic lens is provided, the first lens having a convex surface with an optic zone that provides substantially all of the distance optical power and a concave surface with an optic zone of with at least two concentric, annular portions, the power of each of the at least two annular portions substantially equal to that of the distance optical power. The second lens provides a convex surface having an optic zone that provides substantially all of the near optical power and a concave surface that provides an optic zone of at least two concentric, annular portions, the power of each of the at least two annular portions substantially equal to that of the near optical power.

Alternatively, rings of intermediate power, or power between that of the near and distance optical power may also be provided. As yet another alternative, the lens may provide progressive multifocal correction. Suitable bifocal, multifocal and progressive designs are described in U.S. Pat. Nos. 5,448,312, 5,485,228, 5715,031, 5,929,969, 6,179,420, 6,511,178 and 6,520,638 incorporated herein by reference in their entireties.

As yet another alternative, the lenses of the invention may incorporate correction for higher order ocular aberrations, corneal topographic data, or both. Examples of such lenses are found in U.S. Pat. Nos. 6,305,802 and 6,554,425 incorporated herein by reference in their entireties.

The lenses of the invention may be made from any suitable lens forming materials for manufacturing ophthalmic lenses including, without limitation, spectacle, contact, and intraocular lenses. Illustrative materials for formation of soft contact lenses include, without limitation silicone elastomers, silicone-containing macromers including, without limitation, those disclosed in U.S. Pat. Nos. 5,371,147, 5,314, 960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred contact lens material is a poly 2-hydroxyethyl methacrylate polymer, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Ser. No. 60/363,639 incorporated herein in its entirety by reference.

Curing of the lens material may be carried out by any convenient method. For example, the material may be deposited within a mold and cured by thermal, irradiation, chemical, electromagnetic radiation curing and the like and combinations thereof. Preferably, for contact lens embodiments, molding is carried out using ultraviolet light or using the full spectrum of visible light. More specifically, the precise conditions suitable for curing the lens material will depend on the material selected and the lens to be formed. Suitable processes are disclosed in U.S. Pat. No. 5,540,410 incorporated herein in its entirety by reference.

The contact lenses of the invention may be produced by any convenient method. One such method uses an OPTOFORM™ lathe with a VARIFORM™ attachment to produce mold inserts. The mold inserts in turn are used to form molds. Subsequently, a suitable liquid resin is placed between the molds followed by compression and curing of the resin to form the lenses of the invention. One ordinarily skilled in the art will recognize that any number of known methods may be used to produce the lenses of the invention.

The invention will be clarified further by consideration of the following, non-limiting examples.

EXAMPLES

Example 1

Figure 5:
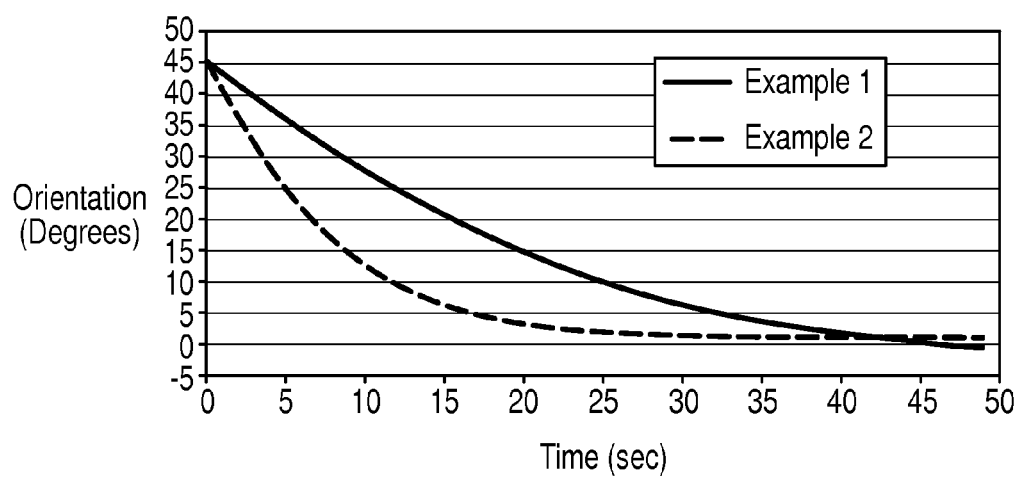
FIG. 5 is a graph depicting the rotation characteristics of lenses of the examples.
Figure 6:
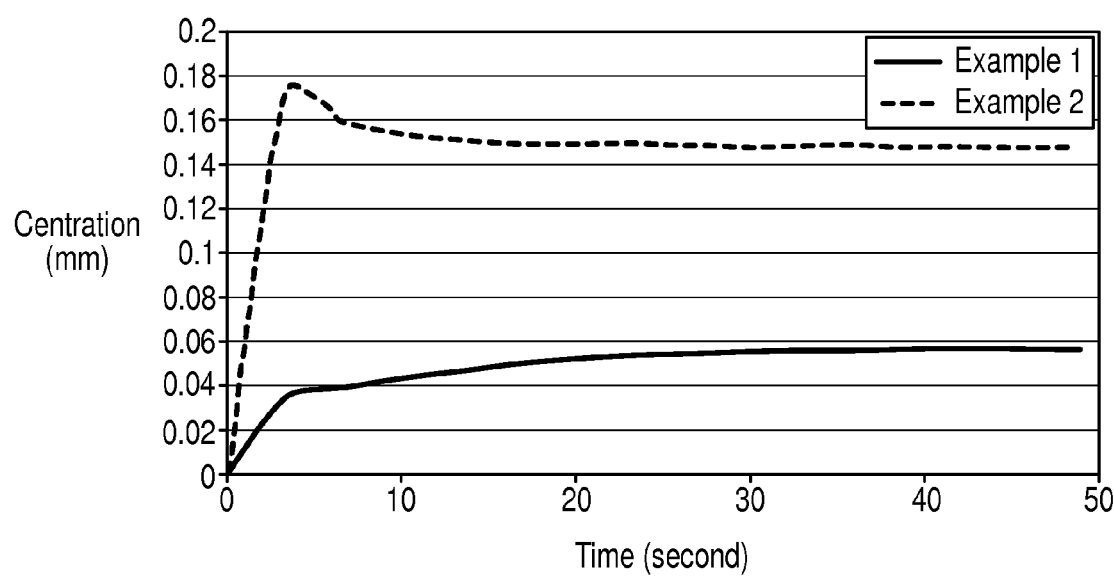
FIG. 6 is a graph depicting the centration characteristics of lenses of the examples.

A prior art contact lens, shown in FIG. 1, is designed having a sphere power of −3.00 diopters, a cylinder power of −0.75 diopters and a cylinder axis of 180 degrees. The dimensional parameters of the lens features and stabilization zones are shown in Table 2 as Example 1. Also, and as shown in FIG. 1, the lens has two, vertically and horizontally symmetric thick zones in the lens periphery. In FIG. 5 is shown that when the lens is rotated off axis by 45 degrees, it returns to within 5 degrees of the stable position 0 in 33 seconds. In FIG. 6 is shown that the lens maintains a centration positions (within 0.2 mm) during the return to a stable orientation and achieves a stable value in 26 seconds. The value within 0.2 mm is a clinically acceptable amount of decentration from a visual performance viewpoint. Thus, during rotation back to a stable position, a lens should not decanter beyond 0.2 mm from zero or vision will be impacted.

TABLE 1

| ULA | LLA | ULP | LLP |
|---|---|---|---|
| −4.41 degrees | 1.06 degrees | 3.74 mm | −6.25 mm |

Example 2

Figure 7:
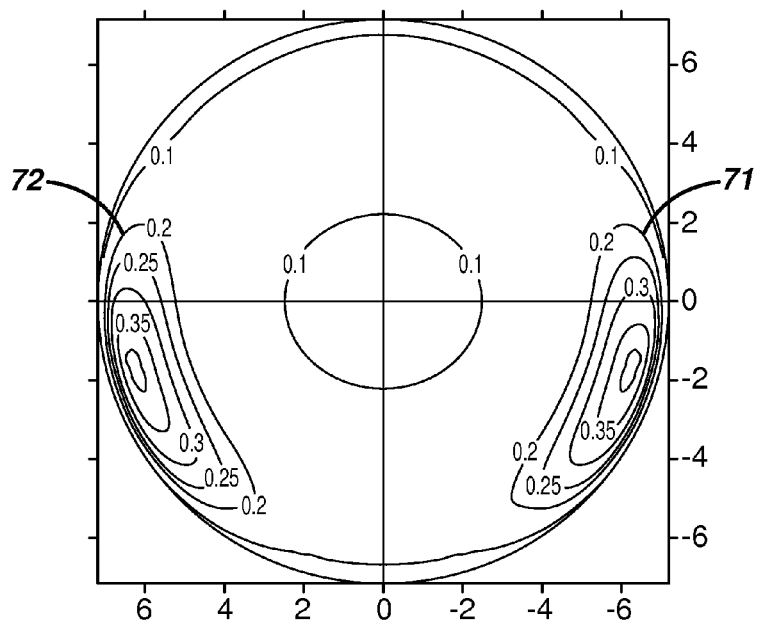
FIG. 7 is a plan view of a surface of the lens of the invention.

A lens with sphere power of −3.00 diopters, a cylinder power of −0.75 diopters and a cylinder axis of 180 degrees and a customized stabilization zone is designed according to the method of the invention using the ocular measurement parameters of Table 1 and lens dimensional parameters shown as Example 2 in Table 2 below. By "nasal" and "temporal" in Table 2 is meant the side of the lens that will be on the nasal and temporal side of the lens, respectfully. FIG. 7 depicts the front surface of the lens in which stabilization zones 71 and 72 are asymmetric.

In FIG. 5 is shown that, when the lens is rotated off axis by 45 degrees, it returns to a stable position (within 5 degrees) in 16 seconds. In FIG. 6 is shown that the lens maintains an acceptable centration position (within 0.2 mm) during the return to a stable orientation and achieves a stable value in 15 secs. These values are a significant improvement in comparison to the lens of Example 1.

TABLE 2

|  | Example 1 | Example 2 |
| --- | --- | --- |
| Lens diameter | 14.50 mm | 14.50 mm |
| Front surface optic zone diameter | 8.50 mm | 8.50 mm |
| Back surface optic zone diameter | 12.50 mm | 12.50 mm |
| Peripheral zone diameter | 14.40 mm | 14.40 mm |
| Front surface radius | 8.604 mm | 8.618 mm |
| Back surface radius (optic) | 8.300 mm | 8.310 mm |
| Stabilization zone maximum thickness | 378 µm | 378 µm |
| Stabilization zone minimum thickness at 6.25 mm from the lens' geometric center | 127 µm | 137 µm |
| Stabilization zone peak nasal location degrees | 0 degrees | −15 degrees |
| Stabilization zone peak temporal location degrees | 180 degrees | 192 degrees |
| Stabilization zone upper nasal ramp angle | 2.24 degrees | 3.17 degrees |
| Stabilization zone lower nasal ramp angle | 2.24 degrees | 3.25 degrees |
| Stabilization zone upper temporal ramp angle | 2.24 degrees | 2.75 degrees |
| Stabilization zone lower temporal ramp angle | 2.24 degrees | 2.68 degrees |
| Stabilization zone nasal angle from the geometric center of the lens and subtended between the top and bottom of the stabilization zone. | No discrete start and finish positions | 104 degrees |
| Stabilization zone temporal angle from the geometric center of the lens and subtended between the top and bottom of the stabilization zone. | No discrete start and finish positions | 120 degrees |

What is claimed is:

1. A contact lens comprising an optic zone, a lens periphery, first and second asymmetric stabilization zones within the lens periphery, an edge and having a vertical axis, a horizontal axis, and a geometric center, the first and second asymmetric stabilization zones each comprising thick zones having a profile determined by a relationship between a meridian angle defined as the angle from the horizontal axis to a location in the thick zone, a quadrant start angle defined as the angle between the horizontal axis and a peak meridian corresponding to the thickest point in the thick zone, a total quadrant angle defined as the angle between the peak meridian and a meridian at which the thick zone ends, and a radial distance from the geometric center of the lens, the first and second asymmetric stabilization zones being asymmetrically positioned about both the horizontal and vertical axes in the lens periphery.

2. The lens of claim 1, wherein each of the thick zones linearly increases in thickness from an uppermost portion of the zone to a peak thickness and then linearly decrease in thickness towards a lowermost portion of the zone.

3. The lens of claim 2, wherein a maximum thickness difference between the thickest portion of a thick zone and a thinnest portions of a thick zone is about 0.1 to about 0.4 mm.

4. The lens of claim 3, wherein the peak of thickness in each of the first and second thick zones is about 5 to about 7 mm from a geometric center of the lens.

5. The lens of claim 3, wherein a radial width of each of the thick zones is about 3 and 4 mm and a circumferential length of each of the thick zones subtends an angle between about 30 and 120 degrees.

6. The lens of claim 4, wherein a radial width of each of the thick zones is about 3 and 4 mm and a circumferential length of each of the thick zones subtends an angle between about 30 and 120 degrees.

7. The lens of claim 2, wherein the peak of thickness in each of the first and second thick zones is about 5 to about 7 mm from a geometric center of the lens.

8. The lens of claim 7, wherein a radial width of each of the thick zones is about 3 and 4 mm and a circumferential length of each of the thick zones subtends an angle between about 30 and 120 degrees.

9. The lens of claim 2, wherein a radial width of each of the thick zones is about 3 and 4 mm and a circumferential length of each of the thick zones subtends an angle between about 30 and 120 degrees.

10. The lens of claim 1, wherein each of the thick zones non-linearly increases in thickness from an uppermost portion of the zone to a peak thickness and then non-linearly decrease in thickness towards a lowermost portion of the zone.

11. The lens of claim 10, wherein a maximum thickness difference between the thickest portion of a thick zone and a thinnest portions of a thick zone is about 0.1 to about 0.4 mm.

12. The lens of claim 11, wherein the peak of thickness in each of the first and second thick zones is about 5 to about 7 mm from a geometric center of the lens.

13. The lens of claim 11, wherein a radial width of each of the thick zones is about 3 and 4 mm and a circumferential length of each of the thick zones subtends an angle between about 30 and 120 degrees.

14. The lens of claim 12, wherein a radial width of each of the thick zones is about 3 and 4 mm and a circumferential length of each of the thick zones subtends an angle between about 30 and 120 degrees.

15. The lens of claim 10, wherein the peak of thickness in each of the first and second thick zones is about 5 to about 7 mm from a geometric center of the lens.

16. The lens of claim 15, wherein a radial width of each of the thick zones is about 3 and 4 mm and a circumferential length of each of the thick zones subtends an angle between about 30 and 120 degrees.

17. The lens of claim 10, wherein a radial width of each of the thick zones is about 3 and 4 mm and a circumferential length of each of the thick zones subtends an angle between about 30 and 120 degrees.

18. The lens of claim 1, having an uppermost portion of said thick zone comprising the portion closest to the top of said lens, and a lowermost portion of said thick zone comprising the portion closest to the bottom of said lens wherein a radial width of each of the thick zones is about 3 and 4 mm and a circumferential length of each of the thick zones subtends an angle between about 30 and 120 degrees and at least one of said uppermost and lowermost portions lies at the intersection of the wearer's eyelid and the peripheral radial distance.

19. The lens of claim 18 wherein the positions corresponding to upper and lower eyelids are determined based on population data.

\* \* \* \* \*